(12) United States Patent
Bonuccelli et al.

(10) Patent No.: US 10,827,832 B2
(45) Date of Patent: Nov. 10, 2020

(54) FURNISHING ITEM COMPRISING AN INTEGRATED HARNESS ASSEMBLY

(71) Applicant: UNIFOR S.P.A., Como (IT)

(72) Inventors: Dante Bonuccelli, Como (IT); Carlo Trevisan, Como (IT)

(73) Assignee: UNIFOR S.P.A., Como (IT)

( * ) Notice: Subject to any disclaimer, the term of this patent is extended or adjusted under 35 U.S.C. 154(b) by 0 days.

(21) Appl. No.: 16/217,789

(22) Filed: Dec. 12, 2018

(65) Prior Publication Data

US 2019/0183242 A1    Jun. 20, 2019

(30) Foreign Application Priority Data

Dec. 14, 2017    (IT) .................. 102017000144492

(51) Int. Cl.
*A47B 21/06*    (2006.01)
*A47B 63/00*    (2006.01)
(Continued)

(52) U.S. Cl.
CPC .............. *A47B 21/06* (2013.01); *A47B 63/00* (2013.01); *A47B 83/001* (2013.01);
(Continued)

(58) Field of Classification Search
CPC ..... A47B 21/06; A47B 87/002; A47B 83/001; A47B 63/00; A47B 2021/066;
(Continued)

(56) References Cited

U.S. PATENT DOCUMENTS 3,883,202 A * 5/1975 Konig .................... A47B 17/00
312/223.6
D322,255 S * 12/1991 Prados ........................ D25/122
(Continued)

FOREIGN PATENT DOCUMENTS

DE    20 2007 013 436 U1    11/2007
EP        2 859 812 A2       4/2015
(Continued)

OTHER PUBLICATIONS

Italian Search Report for corresponding Italian Patent Application No. 102017000144492 dated Apr. 25, 2018, 8 pages.

*Primary Examiner* — Stanton L Krycinski
(74) *Attorney, Agent, or Firm* — Merchant & Gould P.C.

(57) ABSTRACT

A furniture item (1) includes a supporting plane (2) defining a top supporting plane surface (3). A wiring assembly (10) is associated with the supporting plane (2), arranged outside the supporting plane (2) and above the top supporting plane surface (3), extending with respect to the top surface (3) moving away to create a barrier of discontinuity of the top supporting plane surface (3). The wiring assembly (10) includes a body (20, 21) having a shoulder wall (22) extending outside the supporting plane surface (3). The body (20, 21) defines an inner channel (24, 25) within the assembly (10) and adapted to receive power supply and/or service devices (91, 92, 93) therein. The inner channel (20, 21) extends in a direction substantially parallel to the top supporting plane surface (3). A fastening device (40) fastens the wiring assembly (10) to the supporting plane (2).

14 Claims, 9 Drawing Sheets

(51) Int. Cl.
  *A47B 83/00* (2006.01)
  *F16L 3/26* (2006.01)
  *A47B 87/00* (2006.01)
(52) U.S. Cl.
  CPC .............. *A47B 87/002* (2013.01); *F16L 3/26* (2013.01); *A47B 2021/064* (2013.01); *A47B 2021/066* (2013.01); *A47B 2200/12* (2013.01); *A47B 2220/0091* (2013.01)
(58) Field of Classification Search
  CPC ........ A47B 2220/0091; A47B 2200/12; A47B 2021/064; F16L 3/26
  See application file for complete search history.

(56) References Cited

U.S. PATENT DOCUMENTS

| | | | | |
|---|---|---|---|---|
| 5,575,668 A * | 11/1996 | Timmerman | ........... | A47B 21/06 174/482 |
| 6,004,157 A * | 12/1999 | Glass | ..................... | A47B 21/06 439/535 |
| 6,379,182 B1 * | 4/2002 | Byrne | ..................... | H01R 13/73 439/574 |
| 7,407,392 B2 * | 8/2008 | Cooke | ..................... | A47B 21/06 108/62 |
| 7,736,178 B2 * | 6/2010 | Byrne | ..................... | G06F 1/266 439/527 |
| 7,938,679 B2 * | 5/2011 | Wadsworth | ............ | H01R 13/74 439/574 |
| 8,109,215 B2 * | 2/2012 | Kitada | ................... | A47B 21/00 108/50.02 |
| 8,925,469 B2 * | 1/2015 | Bennie | .................. | A47B 21/06 108/50.02 |
| 9,220,342 B2 * | 12/2015 | Byrne | .................... | A47B 97/00 |
| 9,392,869 B2 * | 7/2016 | Byrne | .................... | H02G 3/123 |
| 10,117,511 B2 * | 11/2018 | Gosling | ................ | A47B 21/06 |
| 10,202,992 B2 * | 2/2019 | Matthai | ................ | F16M 13/022 |
| 2002/0119698 A1 * | 8/2002 | McCarthy | .............. | H01R 13/73 439/574 |
| 2005/0263041 A1 * | 12/2005 | Mueller | ................. | A47B 21/06 108/50.02 |
| 2007/0251428 A1 * | 11/2007 | Mead | .................... | A47B 13/02 108/50.02 |
| 2008/0200050 A1 * | 8/2008 | Byrne | .................... | H01R 35/04 439/131 |
| 2011/0089768 A1 * | 4/2011 | Byrne | .................... | H01F 38/14 307/104 |
| 2011/0177714 A1 * | 7/2011 | Byrne | .................... | H02G 3/185 439/535 |
| 2014/0106610 A1 | 4/2014 | Byrne et al. | | |

FOREIGN PATENT DOCUMENTS

| | | | |
|---|---|---|---|
| JP | 2001-070054 A | | 3/2001 |
| JP | 2009056329 A | * | 3/2009 |

* cited by examiner

FURNISHING ITEM COMPRISING AN INTEGRATED HARNESS ASSEMBLY

This application claims benefit of Ser. No. 102017000144492, filed Dec. 14, 2017 in Italy and which application is incorporated herein by reference. To the extent appropriate, a claim of priority is made to the above-disclosed application.

FIELD OF THE INVENTION

The present invention relates to a furniture item comprising a wiring assembly. For example, the furniture item is a workstation or a bookcase.

BACKGROUND

In the furniture field, and in particular of workstations, for example a desk, the need has been felt for a long time to integrate electrical cables and sockets in the furniture item itself so as to make such sockets easily accessible.

Tables or desks with electrical sockets are known to be inserted in openings made on the work surface. In other words, the work surface has some holes in which electrical sockets are attached. The body of such electrical sockets is therefore arranged below the work surface, sometimes inside boxes projecting below the work surface itself. Likewise, electrical cables are generally fixed below the work surface itself.

This known technique is not without drawbacks.

In fact, the body of the sockets, together with the box containing them, and together with the electrical cables, sometimes inserted within projecting channels, reduces the available space under the tabletop, thus creating an impediment to comfort of use.

Another, no less negative drawback is that the insertion of such sockets in the work surface requires making said openings for the relative housing. This reduces the upper surface of the work surface available for use by a user or an operator. Furthermore, this known solution requires that such openings be made, entailing additional production costs or labor costs to modify pre-existing workstations.

Furthermore, workstations often require the presence of a partition screen to separate portions of the supporting plane to be dedicated to multiple users.

These partition screens also contribute to the reduction of the available space on the work surface or on the supporting plane.

Hence, the need is felt to hide the sockets and cables from view, and to avoid reducing the available space both above and below the supporting surface of a workstation, avoiding drilling the work surface itself.

SUMMARY OF THE INVENTION

It is an object of the present invention to devise and provide a furniture item comprising a wiring assembly which allows to fulfill the above requirements and obviate at least partially the drawbacks mentioned above with reference to the prior art.

In particular, it is an object of the present invention to provide a furniture item that allows the wiring to be hidden from view and to avoid reducing the available space both above and below the supporting surface of a workstation.

In addition, it is an object of the present invention to provide the wiring and current socket elements without drilling the work surface itself.

It is a further object of the present invention to allow a refitting of a pre-existing furniture item having a supporting surface, equipping it with electrical wiring easily accessible and directly available where required, without making any type of structural modification to said furniture item.

BRIEF DESCRIPTION OF THE DRAWINGS

The invention will be shown hereafter by describing some embodiments thereof, given as a non-limiting example, with reference to the accompanying drawings, in which.

DESCRIPTION OF THE PREFERRED EMBODIMENTS

Figure 1:
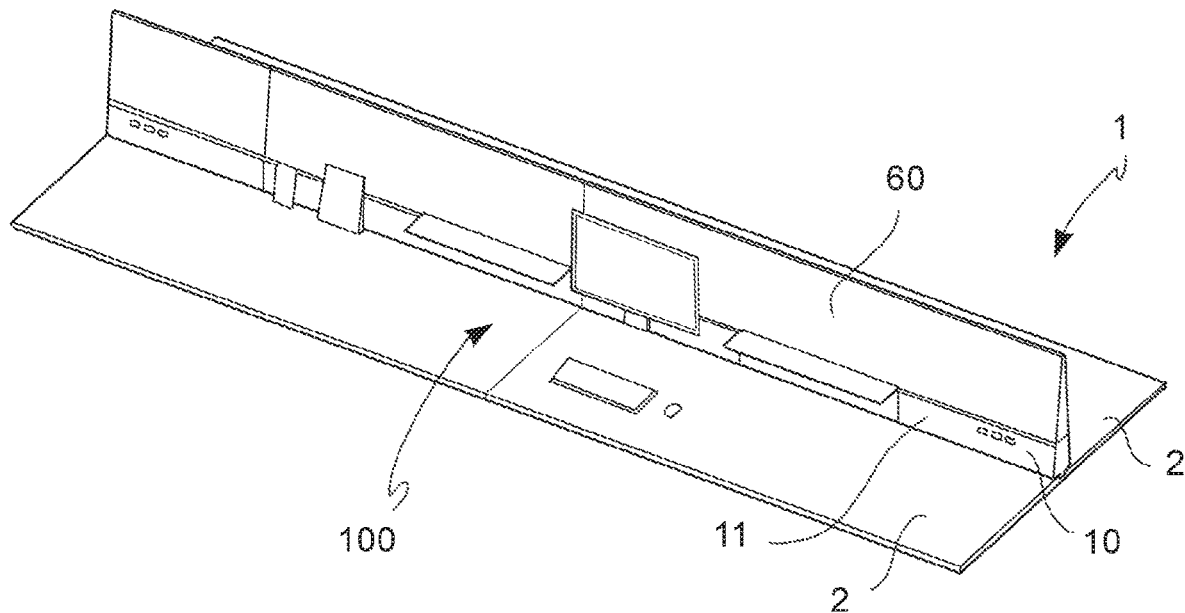
FIG. 1 shows a perspective view of a furniture item, in particular a workstation, according to the invention, comprising a continuous partition screen for the entire length of the supporting plane.
Figure 2:
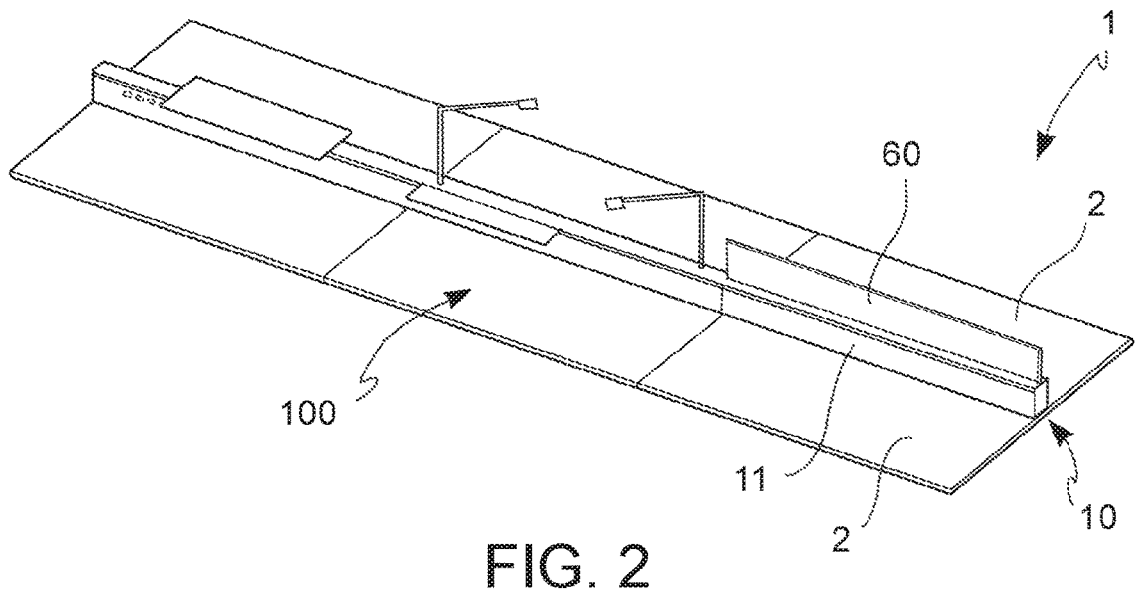
FIG. 2 shows a perspective view of another embodiment of the furniture item in FIG. 1, in which the partition screen is present only for a portion of the length of the wiring assembly, and in which there are further accessories mounted to the wiring assembly, such as lamps and shelves.

With reference to the figures, a furniture item according to the invention is generally designated by reference numeral 1.

The furniture item comprises a supporting surface 2 defining a top supporting plane surface 3, preferably adapted to be arranged substantially horizontal. For example, the work surface is the work surface of a workstation with one or more work areas separated by partition screens.

The furniture item 1 comprises a wiring assembly 10 associated, or integrated, with said supporting surface 2, arranged outside said supporting surface 2 and above said top supporting plane surface 3.

According to an embodiment, the wiring assembly 10 is arranged completely outside said supporting surface 2 and above said top supporting plane surface 3.

In the present description, the term "longitudinal" means a main direction of development of the wiring assembly.

The expression "upper surface" and "above" the supporting surface means the part of the supporting surface opposite to a floor on which the furniture item is positioned.

Said wiring assembly 10 extends with respect to said top surface 3 moving away, to create a barrier of discontinuity of the top supporting plane surface 3, and comprises at least one body 20, 21 in turn comprising at least one shoulder wall 22, which extends outside the surface of the supporting plane 3.

According to an embodiment, the at least one shoulder wall is arranged transversely, preferably orthogonally, with respect to the top supporting plane surface 3.

According to an embodiment, the wiring assembly 10 extends transversely with respect to said top supporting plane surface 3, preferably orthogonally to the top supporting plane surface 3.

According to a preferred embodiment, the shoulder wall is flat, preferably plate-like, and preferably extends over the entire length of the body.

The at least one body 20, 21 defines at least one channel 24, 25 inside said assembly 10 and adapted to receive power supply and/or service devices (91, 92, 93) therein.

For example, the power supply and/or service devices comprise electrical cables 91 and/or electricity sockets and/or data sockets 93, and/or supply lines for a fluid or a fluid under pressure.

The at least one inner channel 20, 21 extends in a direction substantially parallel to the top supporting plane surface 3.

According to an embodiment, the at least one inner channel 20, 21 may be accessed in a direction parallel to the top supporting plane surface 3.

The furniture item further comprises a fastening device 40 for fastening said wiring assembly 10 to said supporting plane 2.

According to an embodiment, the fastening device 40 is configured to removably fasten the wiring assembly 10 preferably to a side edge 2' of the supporting plane 2.

This provision is particularly advantageous in that it avoids having to make holes through the supporting surface, or to make openings thereto. This provision allows, therefore, the wiring assembly to be removably fastened in a peripheral position of the work surface, preventing avoiding hindering the user.

Moreover, this provision allows a refitting of pre-existing furniture items to be obtained without modifying them.

For example, the fastening device comprises a screw clamp.

According to an embodiment, the wiring assembly 10 and the fastening device 40 are configured to form as a whole a longitudinal base groove 52 starting from the top surface 3 of the supporting plane 2 and facing externally to the wiring assembly 10 on the same side of the at least one inner channel 20, 21.

Figure 14:
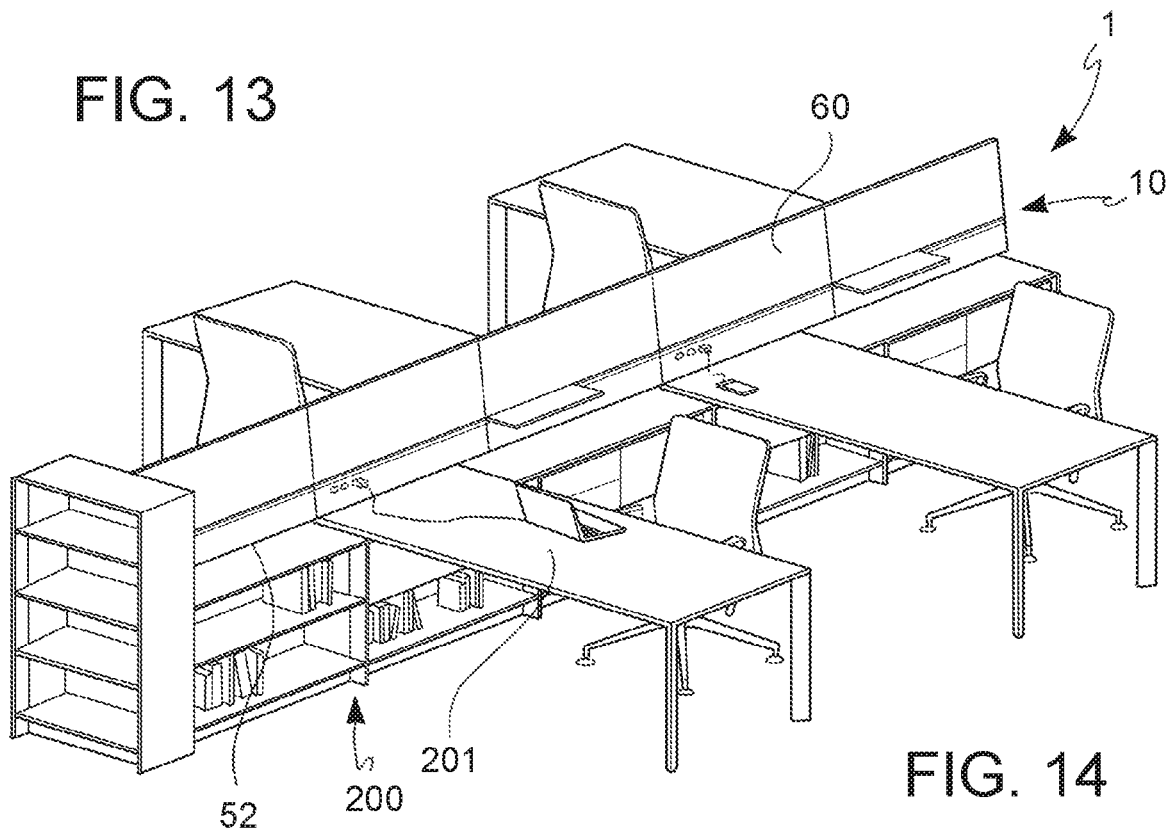
FIG. 14 shows a perspective view of a furniture item according to the invention, in which the furniture item is a bookcase having a top supporting plane, and in which the furniture item has a longitudinal base channel interposed between the supporting plane and the wiring assembly, and a plurality of work surfaces, one end edge of which is housed inside said base channel.

The base groove 52 is configured to house a lateral edge of an additional supporting plane 201 therein. For example, FIG. 14 shows an embodiment of the invention in which the furniture item comprises a bookcase having a top supporting plane on which a wiring assembly as described above is shown. The base groove 52 allows the additional plane 201 to be retained.

Such a configuration may also allow the additional plane to slide along said base groove 52 to adjust the position thereof.

According to an embodiment, the at least one body 20, 21 comprises a bottom wall 27 transverse to said shoulder wall 22, facing said top supporting surface 3 and configured to engage said fastening device 40, a top wall 28 transverse to said shoulder wall 22 and opposite to said bottom wall 27, said bottom wall 27 and said top wall 28 extending from said shoulder wall 22 forming together with said shoulder wall 22 a profile with a C-shaped section.

According to an embodiment, bottom wall 27 and the top wall 28 are substantially parallel to each other and substantially parallel to the top supporting plane 3.

According to an embodiment, the bottom wall 27 and the top wall 28 are substantially orthogonal to the shoulder wall 22.

According to an embodiment, at least one of the bottom wall 27 and the top wall 28, or both, are flat plate-like walls.

According to an embodiment, the bottom wall 27 and the top wall 28 are made in one piece with the shoulder wall 22.

According to an embodiment, the at least one body 20, 21 comprises an intermediate wall 29 which extends transversely from said shoulder wall 22 and interposed between the bottom wall 27 and the top wall 28, where said at least one channel 24, 25 comprises a bottom channel 24 defined by the bottom wall 27, the shoulder wall 22 and the intermediate wall 29, and a top channel 25 defined by the intermediate wall 29, the shoulder wall 22 and the top wall 28, where the bottom channel 24 and the top channel 25 are both facing on the same side of said at least one body 20, 21.

According to an embodiment, the intermediate wall 29 is flat plate-like.

According to an embodiment, the intermediate wall 29 is made integrally with the shoulder wall 22.

According to an embodiment, the wiring assembly 10 comprises an openable door 31 and hooking means 32 to removably engage said openable door 31 to a free end edge of said top wall 28 and to a free end edge of said bottom wall 27.

According to an embodiment, the hooking means 32 are configured to open the openable door by means of an elastic snap release and a rotation in opening thereof with respect to the body along a longitudinal end edge of the door and to remove the door continuing the rotation of the door itself beyond a fixed angle.

Likewise, the hooking means are configured to engage the door by inserting an end edge into said body and rotating the door around said edge towards the body, and to close the door by means of snap elastic coupling.

According to an embodiment, the hooking means 32 comprise a longitudinal groove which extends internally to an end edge of one between the top wall 28 and the bottom wall 27, said groove having a circular arc cross section, and a first end portion of said openable door 31 having a circular arc cross section complementary to the groove, engageable in said groove allowing a rotation of said openable door with respect to the body 20, 21.

According to an embodiment, the hooking means 32 further comprise a longitudinal projection which projects from the other one of said top wall and said bottom wall, and a second end portion of said door, opposite to the first one, configured to elastic-snap engaging with said longitudinal projection.

Figure 6:
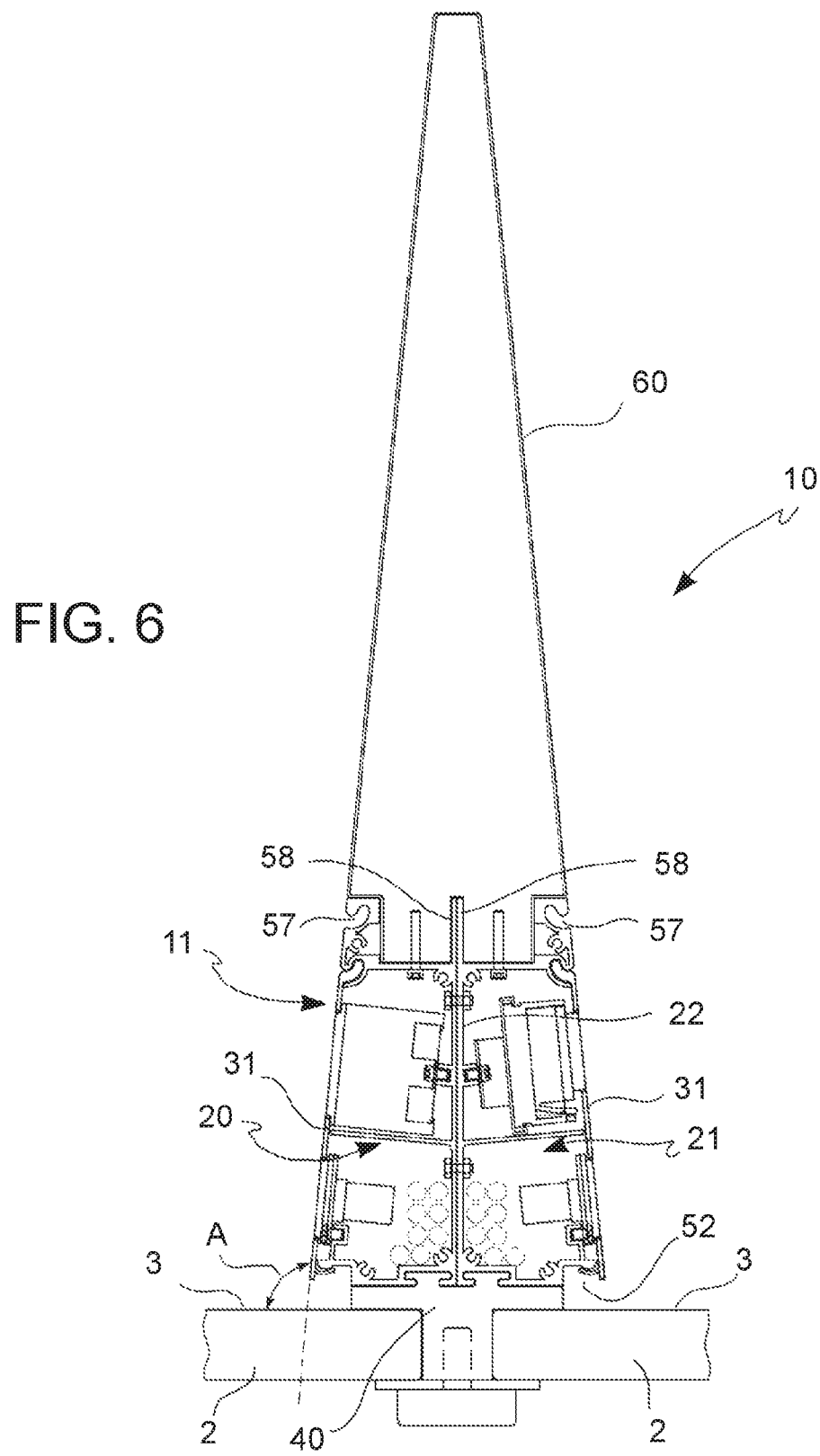
FIG. 6 shows an embodiment of the invention, in which the partition screen has an isosceles-shaped cross-section, as an upward extension of the wiring assembly.
Figure 7:
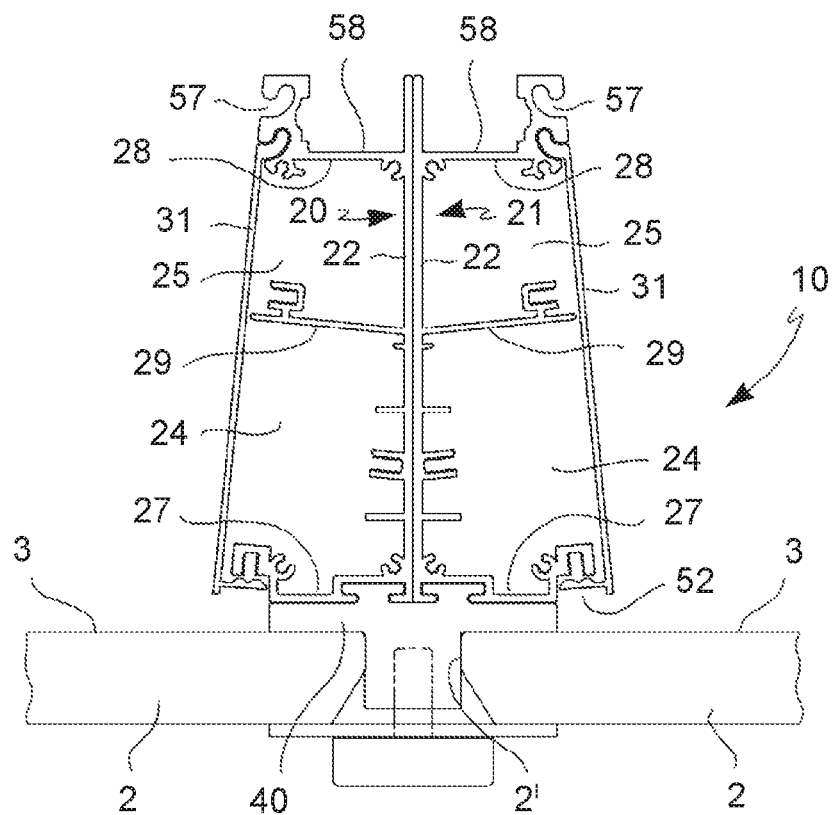
FIG. 7 shows a sectional view of an embodiment of the body in which the lower channel comprises fastening tabs adapted to allow to fasten the body of a socket thereto, by means of screws or snap-action.
Figure 8:
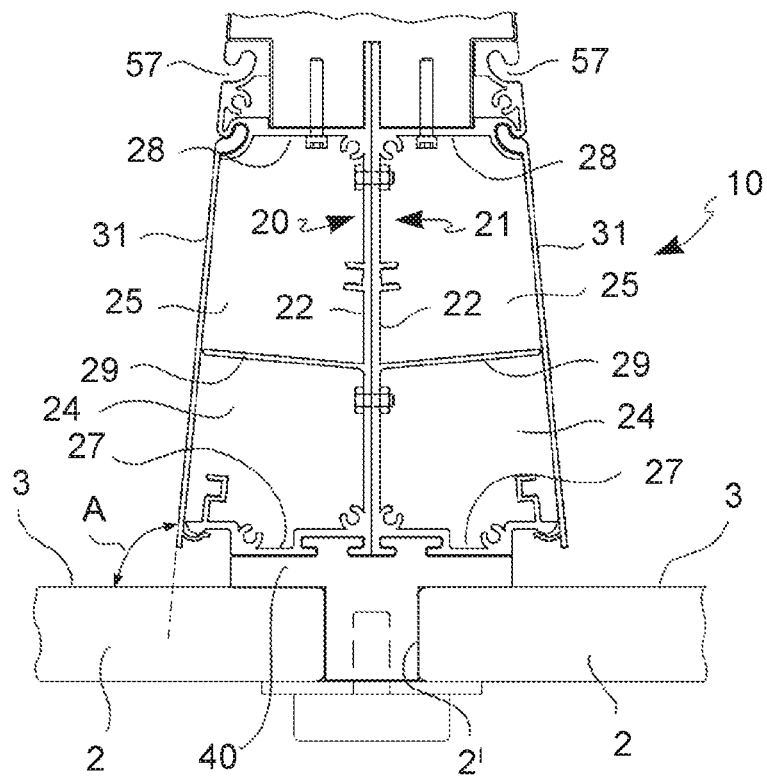
FIG. 8 shows a sectional view of an embodiment of the body in which the upper channel comprises fastening tabs adapted to allow to fasten the body of a socket thereto, by means of screws or snap-action.

According to an embodiment, the wiring assembly 10 defines at least one outer side face 11 inclined with respect to said top supporting plane surface 3, according to an obtuse angle A between said top supporting plane surface 3 and said outer side face 11, evaluated externally of said wiring assembly 10. For example, FIG. 6 shows the angle A.

In other words, the thickness of the wiring assembly evaluated transversely to the shoulder wall 22 is decreasing away from the supporting surface 2.

According to an embodiment, the openable door 31 defines said at least one outer side surface 11.

According to an embodiment, the openable door has a substantially flat shape, for example plate-like.

Figure 3:
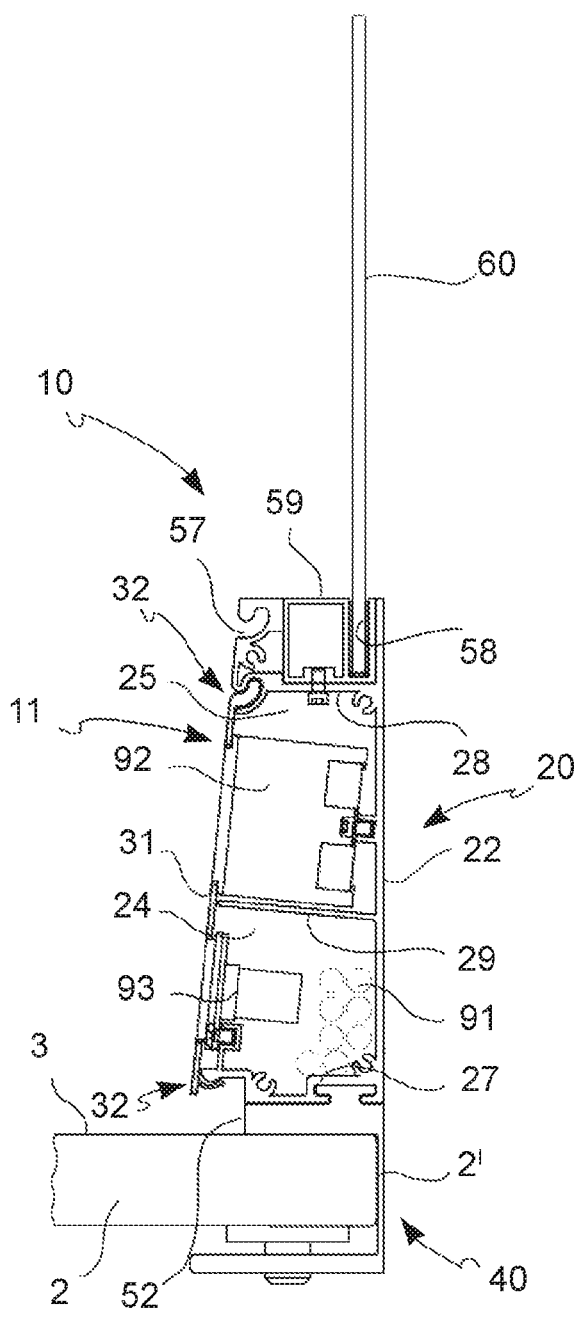
FIG. 3 shows a sectional view of an embodiment of the present invention in which the wiring assembly has a body having two channels facing the same side of the assembly, and in which there is a partition screen consisting of a flat panel, for example glass.
Figure 4:
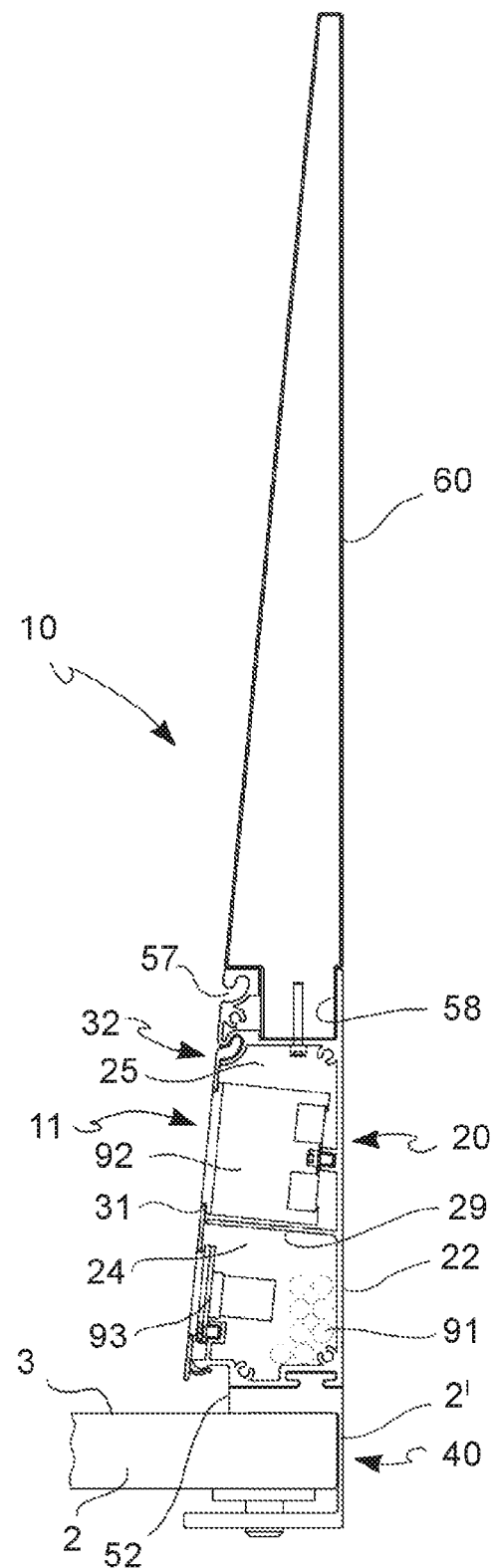
FIG. 4 shows a sectional view of an embodiment of the invention, in which the partition screen is a triangular cross-sectional element arranged as an extension of the wiring assembly with shape continuity.

In other words, the wiring assembly 10 has a trapezoidal rectangular cross-section, where the bottom wall 27 and the top wall 28 form a respective larger base and a respective smaller base of the trapezium, and where the shoulder wall forms the side orthogonal to the base and the openable door 31 forms the inclined side of the trapezium. Such an embodiment is shown in FIGS. 3 and 4.

The presence of the inclined openable door 31 is particularly advantageous in that it reflects both the light and the sound waves away from the user seated in front of the furniture item, in particular the workstation.

According to an embodiment, the at least one body 20, 21 is an extruded section, preferably metal, even more preferably obtained from aluminum or aluminum alloy.

According to an embodiment, the at least one body 20, 21 consists of two inner bodies 20, 21, which are equal to each other and joined together along said shoulder wall 22 forming a symmetrical structure with respect to a plane defined by said shoulder wall 22.

In this case, the two inner bodies together form a symmetrical structure having an isosceles trapezoidal cross-section. This embodiment is suitable for separating two opposing areas of the supporting surface, to confine two operating spaces of two users.

Similarly, to the above description, the bottom and top walls together form the smaller base and the larger base of the trapezium, and the openable doors associated with the two inner bodies form the inclined sides of the trapezium.

According to an embodiment, the two inner bodies 20, 21 are made in one piece, preferably in a single extruded section bar.

According to an embodiment, the furniture item 1 comprises a partition screen 60, or panel, fixed to, and above the, wiring assembly 10 as an extension thereof on the opposite side with respect to the supporting plane 2.

According to an embodiment, the at least one body 20, 21 comprises an open longitudinal top channel which faces away from the supporting plane.

According to an embodiment, such a top channel has a "U" or square cross-section.

According to an embodiment, a bottom edge of the partition screen 60 is received and locked inside said top channel 58. According to an embodiment, the partition screen 60 is locked inside the top channel 58 by means of an additional section 59.

According to an embodiment, the wiring assembly 10 comprises a longitudinal groove for bracket 57, adapted to receive and hook a supporting bracket for hooked objects, e.g. a shelf, therein.

For example, the groove for bracket 57 has a circular arc-shaped cross-section.

Figure 13:
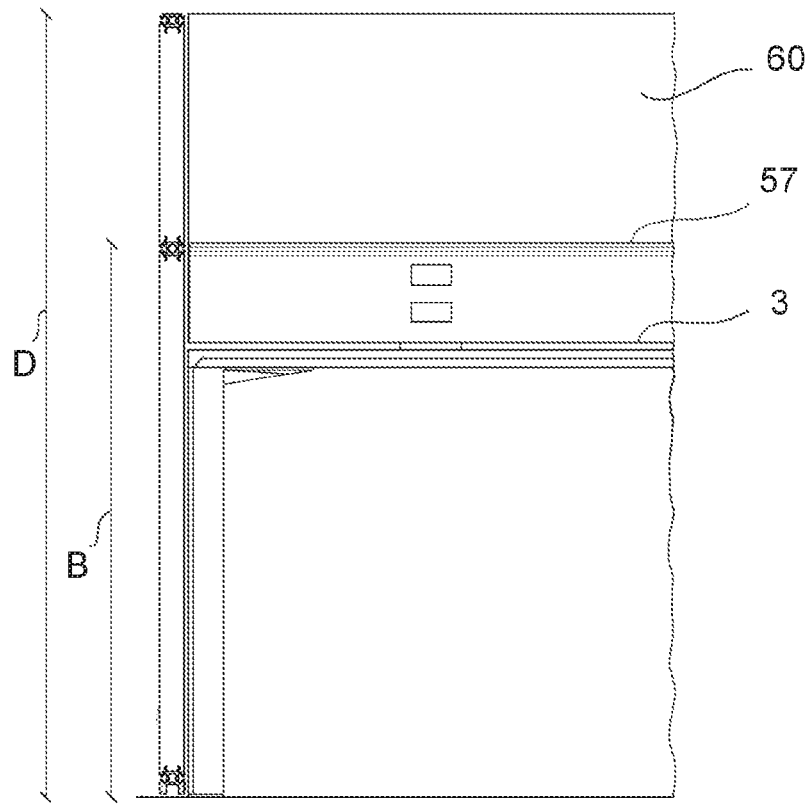
FIG. 13 shows a partial view of a workstation according to the invention having the wiring assembly.

According to an embodiment, as shown for example in FIG. 13, the groove for bracket 57 is at a predetermined height B from a floor on which the furniture item lies.

According to an embodiment, such a predetermined height B is from 900 mm to 1000 mm, preferably 910 mm. According to an embodiment, the overall height D of the furniture item 1 comprising the partition screen 60 is from 1150 mm to 1400 mm, preferably 1287 mm.

Figure 5:
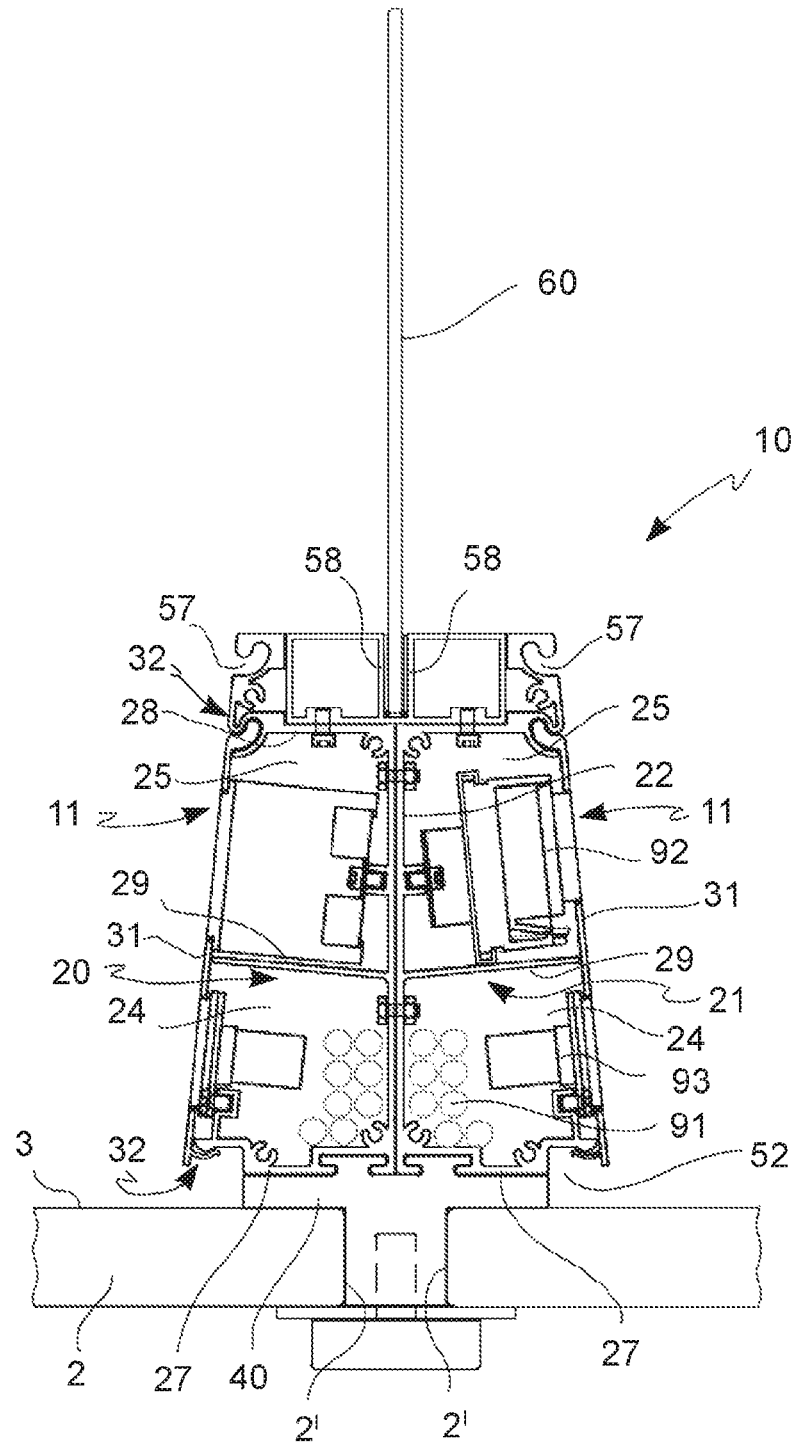
FIG. 5 shows a cross-sectional view of another embodiment of the invention in which the wiring assembly comprises two inner bodies having equal cross-sections and joined together along respective outer shoulder surfaces, and in which the furniture item comprises a flat plate partition screen.
Figure 9:
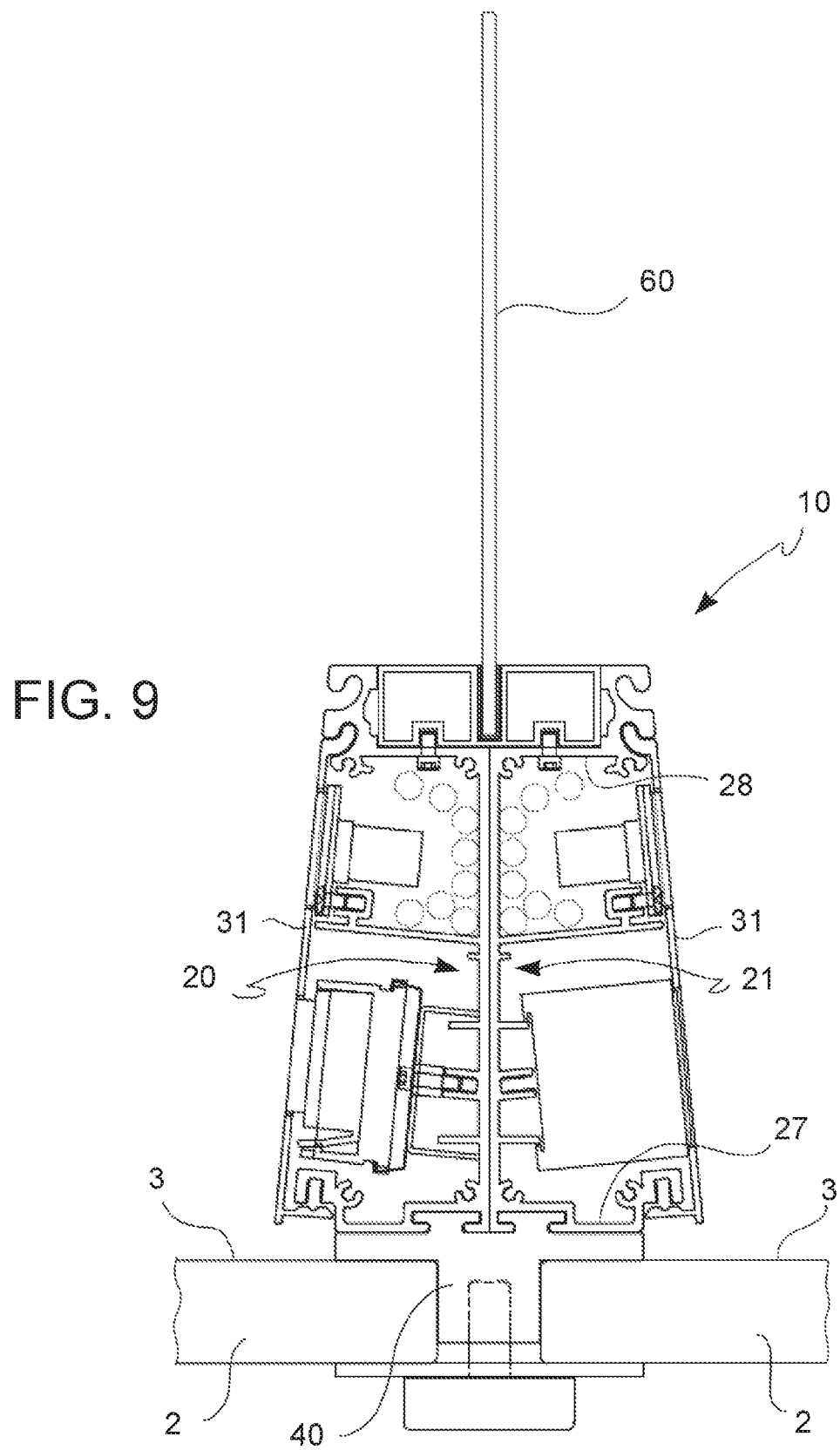
FIG. 9 shows a cross-sectional view of an alternative embodiment to that in FIG. 5 with the sole difference of inverting the position between the electricity sockets and the data communication sockets.
Figure 10:
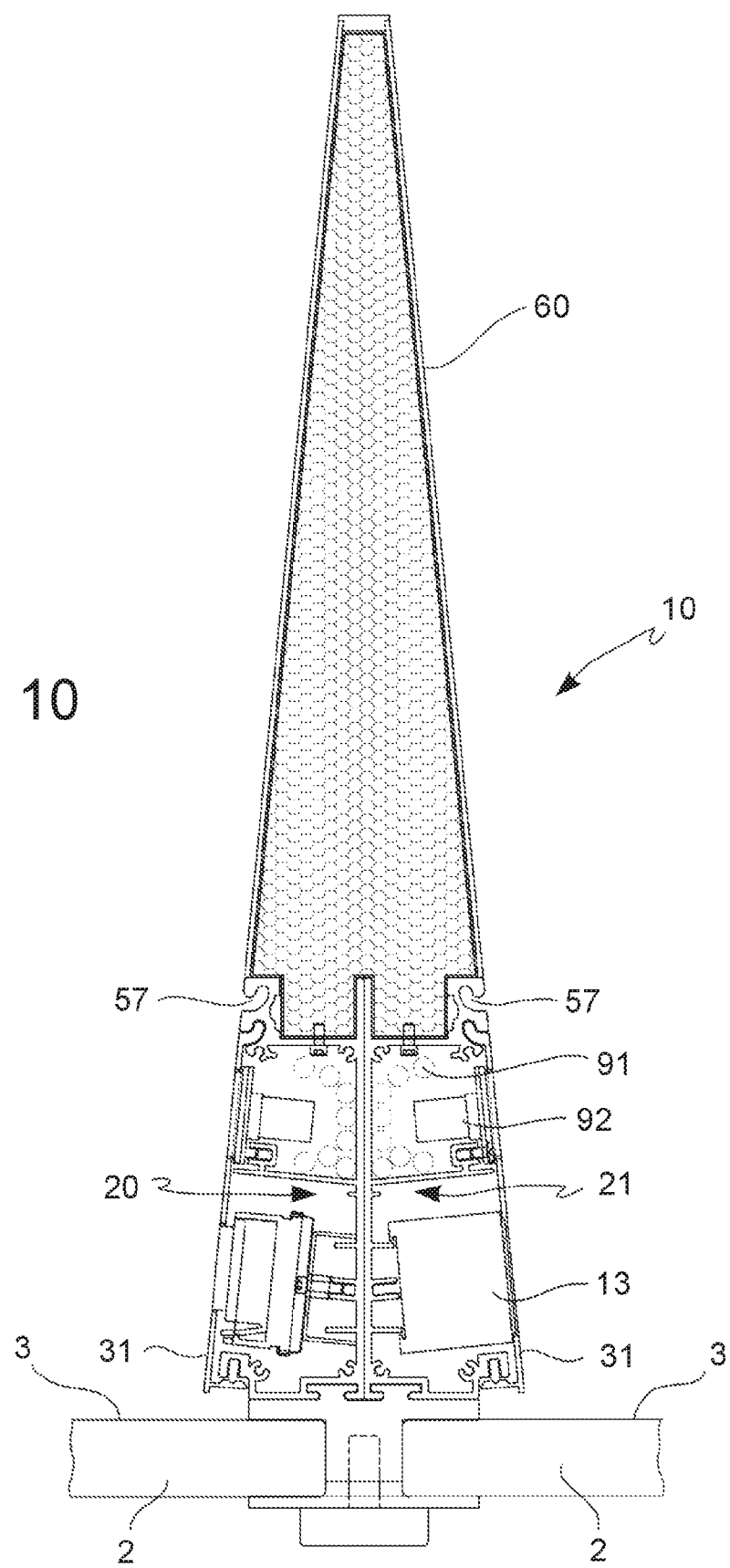
FIG. 10 shows a cross-sectional view of the embodiment in FIG. 6, with the sole difference of inverting the position between the electricity sockets and the data communication sockets.

The partition screen 60 has, for example, a plate-like shape, preferably flat, as shown for example in FIGS. 3, 5 and 9. For example, it is made from glass, or cloudy glass, or silk-screened glass.

According to an embodiment, the partition screen 60, as shown in FIGS. 4, 6, 60, extends as an extension of the wiring assembly 10 with shape continuity.

Preferably, in this case the partition screen 60 has a substantially isosceles or rectangle triangle cross-section.

Moreover, in the case of a partition with variable section, it may be made of sheet metal, preferably metal, preferably aluminum.

This sheet may be externally covered with a thumbtackable fabric, Forbo, or be micro-perforated or veneered aluminum.

Figure 11:
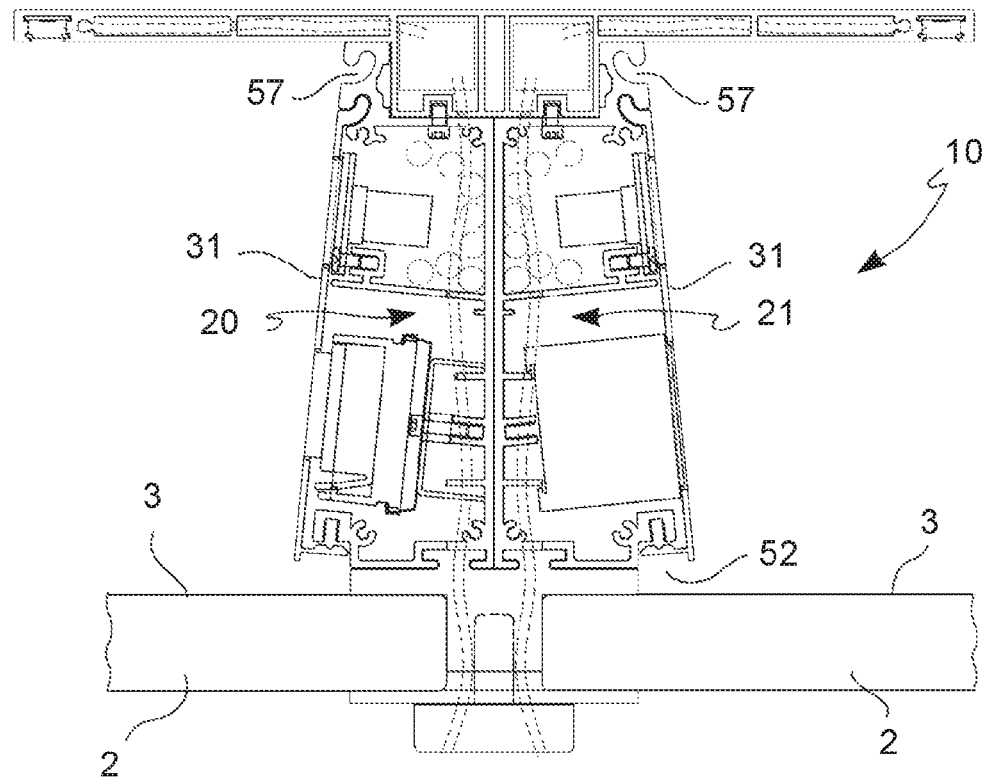
FIG. 11 shows an embodiment of the present invention in which the furniture item comprises a lamp integrated in a shelf fixed to the wiring assembly in place of the partition screen.

According to an embodiment, as shown in FIG. 11, the furniture item comprises a lamp, for example LED, and for example mounted in the top channel 58.

Figure 12:
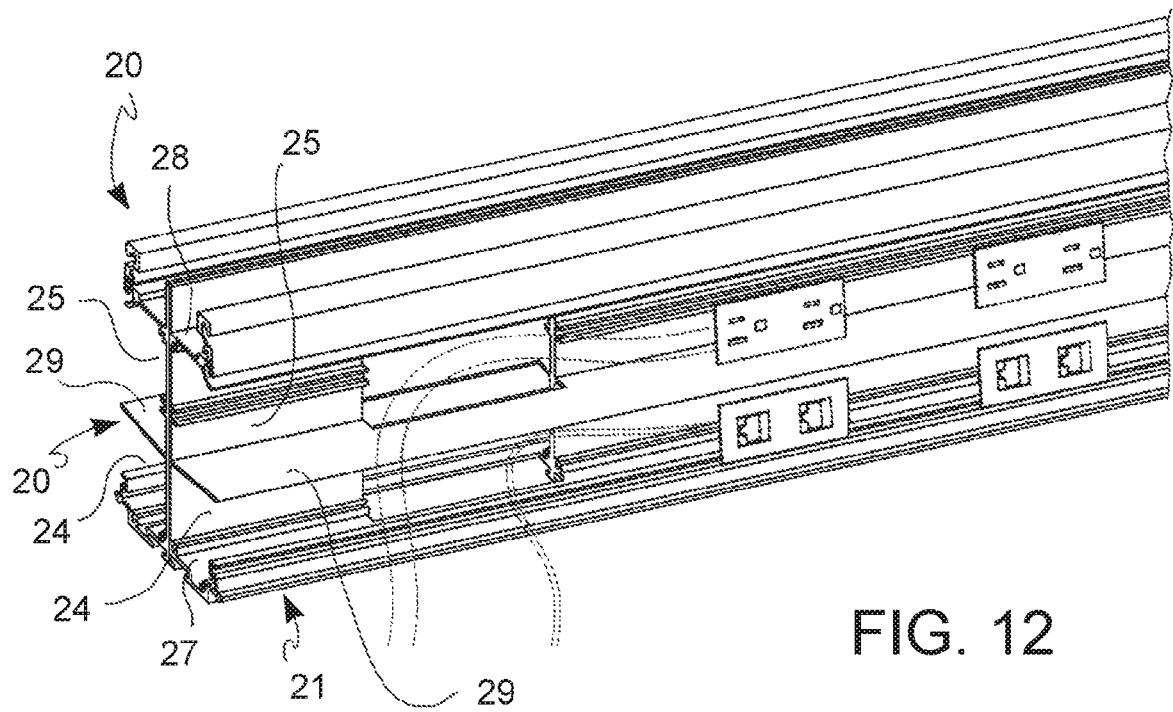
FIG. 12 shows a perspective view of a body portion, having cable passage windows for crossing and reaching all the inner channels.

As shown in FIG. 12, the at least one body 20, 21 may comprise windows for passing cables to cross the various inner channels.

According to an embodiment, the furniture item 1 is a table 100, or an operating station, where the supporting plane 2 is a work surface or where the furniture item 1 is a bookcase 200 if the supporting plane is a shelf or an upper end plane of said bookcase 200.

Those skilled in the art may make several changes, adjustments, adaptations, and replacements of elements with others that are functionally equivalent, to the embodiments of the device described above in order to meet incidental needs, without departing from the scope of the following claims. Each of the features described as belonging to a possible embodiment can be obtained irrespective of the other embodiments described.

The means and materials for implementing the various functions described may be of various types without departing from the scope of the invention.

All the features described herein may be combined according to any combination, except for combinations in which at least some of these features are mutually exclusive.

The invention claimed is:

1. A furniture system comprising:
   a first furniture item comprising a table or an operating station or a bookcase with a supporting plane, wherein the supporting plane is a work surface of the table or the operating station, or a shelf or an upper end plane of the bookcase, the supporting plane defining a top supporting plane surface;

a second furniture item comprising a work plane;
a wiring assembly associated with said supporting plane, arranged outside said supporting plane and above said top supporting plane surface, extending away with respect to said top supporting plane surface to create a barrier of discontinuity of the top supporting plane surface; said wiring assembly comprising a body comprising a shoulder wall extending outside the top supporting plane surface, said body defining an inner channel within said wiring assembly and adapted to receive power supply and/or service devices in said inner channel, said inner channel extending in a direction substantially parallel to the top supporting plane surface;
a fastening device for fastening said wiring assembly to said supporting plane;
wherein the wiring assembly, the fastening device, and the top supporting plane surface form as a whole a longitudinal base groove facing externally to the wiring assembly on a same side of the inner channel; said base groove being configured for housing a lateral edge of the work plane in the base groove, retaining the second furniture item with a portion of the work plane on the top supporting plane surface and allowing the work plane to slide along said base groove to adjust the position of the second furniture item.

2. The furniture system according to claim 1, wherein the shoulder wall is arranged orthogonally to said top supporting plane surface.

3. The furniture system according to claim 1, wherein the body further comprises a bottom wall transverse to said shoulder wall, facing said top supporting plane surface and configured to engage said fastening device, a top wall transverse to said shoulder wall and opposite to said bottom wall, said bottom wall and said top wall extending from said shoulder wall forming together with said shoulder wall a profile with a C-shaped section.

4. The furniture system according to claim 3, wherein the body comprises an intermediate wall extending transversely from said shoulder wall and interposed between the bottom wall and the top wall; wherein said inner channel comprises a bottom channel defined by the bottom wall, the shoulder wall and the intermediate wall, and a top channel defined by the intermediate wall, the shoulder wall and the top wall; wherein the bottom channel and the top channel are both facing on a same side of said body.

5. The furniture system according to claim 3, wherein the wiring assembly comprises an openable door and hook to removably engage said openable door to a free end edge of said top wall and to a free end edge of said bottom wall.

6. The furniture system according to claim 1, wherein the wiring assembly defines an outer side face inclined with respect to said top supporting plane surface, according to an obtuse angle between said top supporting plane surface and said outer side face, evaluated externally of said wiring assembly.

7. The furniture system according to claim 5, wherein said openable door defines an outer side surface.

8. The furniture system according to claim 1, wherein the body is an extruded profile.

9. The furniture system according to claim 1, wherein the body is formed by two bodies equal to each other and joined together along said shoulder wall forming a symmetrical structure with respect to a plane defined by said shoulder wall.

10. The furniture system according to claim 1, wherein the fastening device is configured to removably fasten the wiring assembly to a side edge of the supporting plane.

11. The furniture system according to claim 1, comprising a partition screen, or panel, fixed to and above the wiring assembly as an extension of the wiring assembly on an opposite side with respect to the supporting plane.

12. The furniture system according to claim 1, wherein the second furniture item comprises a table and the work plane comprises a tabletop with an end of the tabletop supported on the top supporting plane surface.

13. Furniture, comprising:
a first furniture item comprising a table or an operating station or a bookcase with a supporting plane, wherein the supporting plane is a work surface of the table or the operating station, or a shelf or an upper end plane of the bookcase, the supporting plane defining a top supporting plane surface;
a wiring assembly associated with said supporting plane, arranged outside said supporting plane and above said top supporting plane surface, extending away with respect to said top supporting plane surface to create a barrier of discontinuity of the top supporting plane surface;
said wiring assembly comprising a body comprising a shoulder wall extending outside the top supporting plane surface, said body defining an inner channel within said wiring assembly and adapted to receive power supply and/or service devices in said inner channel, said inner channel extending in a direction substantially parallel to the top supporting plane surface;
a fastening device for fastening said wiring assembly to said supporting plane;
wherein the wiring assembly and the fastening device are configured to form as a whole a longitudinal base groove facing externally to the wiring assembly on a same side of the inner channel; the wiring assembly forming an upper surface of said base groove, said fastening device forming an inner lateral edge of said base groove, and said top supporting plane surface forming a lower surface of said base groove; said base groove being configured to receive a lateral edge of a complementary planar work element of a second furniture item in the base groove, and configured to support the second furniture item with a portion of the complementary planar work element of the second furniture item over and proximate the top supporting plane surface and allowing the complementary planar work element to slide along said base groove to adjust the position of the second furniture item relative to the first furniture item.

14. The furniture according to claim 13, wherein the complementary planar work element comprises a complementary tabletop, and wherein the base groove is configured to receive and support the complementary tabletop with an end of the complementary tabletop supported on the top supporting plane surface.

* * * * *